US012250754B2

(12) United States Patent
Puvanakijjakorn et al.

(10) Patent No.: US 12,250,754 B2
(45) Date of Patent: Mar. 11, 2025

(54) DIGITAL TO ANALOG DIMMING CONTROL

(71) Applicant: Wangs Alliance Corporation, Port Washington, NY (US)

(72) Inventors: Voravit Puvanakijjakorn, Port Washington, NY (US); Chen Liming, Dongguan (CN)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/782,636

(22) Filed: Jul. 24, 2024

(65) Prior Publication Data

US 2025/0040006 A1 Jan. 30, 2025

Related U.S. Application Data

(60) Provisional application No. 63/528,500, filed on Jul. 24, 2023, provisional application No. 63/650,721, filed on May 22, 2024.

(51) Int. Cl.
*H05B 45/10* (2020.01)
*H05B 45/30* (2020.01)

(52) U.S. Cl.
CPC ............. *H05B 45/10* (2020.01); *H05B 45/30* (2020.01)

(58) Field of Classification Search
CPC ...... H05B 45/31; H05B 45/325; H05B 45/36; H05B 45/385; H05B 47/185; H05B 45/20; H05B 45/3575; H05B 45/3577; H05B 45/10; H05B 47/18; H05B 45/12; H05B 45/14; H05B 45/315; H05B 45/3578; H05B 45/3725; H05B 45/375; H05B 45/38; H05B 45/395
See application file for complete search history.

(56) References Cited

U.S. PATENT DOCUMENTS

2015/0237694 A1 8/2015 Zudrell-Koch
2016/0095186 A1 3/2016 Reed
2019/0098723 A1* 3/2019 Sadwick ................. F21K 9/272
2019/0320515 A1* 10/2019 Sadwick ................ H05B 45/00
2022/0201820 A1* 6/2022 Kumar ................. H05B 47/185

* cited by examiner

*Primary Examiner* — Monica C King
(74) *Attorney, Agent, or Firm* — Weiss & Arons LLP

(57) ABSTRACT

Apparatus, methods and systems for dimming light. The apparatus may include a controller unit. The controller unit may include a lighting power output port. The controller unit may include a microcontroller that may receive a digital lighting control signal and may obtain a light dimming level from the digital lighting control signal. The controller unit may include analog phase cut circuitry that may receive the light dimming level from the microcontroller and may provide lighting power corresponding to the received light dimming level to the lighting power output port. The controller unit may include a digital lighting control output circuit that may transmit the digital lighting control signal to another controller unit in a first state and attenuate the digital lighting control signal in a second state. The controller unit may include a mode circuit that may transmit a stored brightness level to the analog phase cut circuitry.

28 Claims, 13 Drawing Sheets

DIGITAL TO ANALOG DIMMING CONTROL

CROSS-REFERENCE TO RELATED APPLICATIONS

This application is a nonprovisional of U.S. Provisional Application No. 63/528,500, filed Jul. 24, 2023 and U.S. Provisional Application No. 63/650,721, filed on May 22, 2024, which are hereby incorporated by reference herein in their entireties.

BACKGROUND

Digital lighting control systems typically distribute lighting power and digital lighting control information to light fixtures via a network of controllers. A controller may interpret the lighting control information and control a corresponding fixture based on the lighting control information. The fixture is typically configured to receive power conditional for LED lighting.

It would therefore be desirable to provide apparatus and methods for delivering power to non-LED light fixtures via controllers that are configured to control LED fixtures.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

Figure 1:
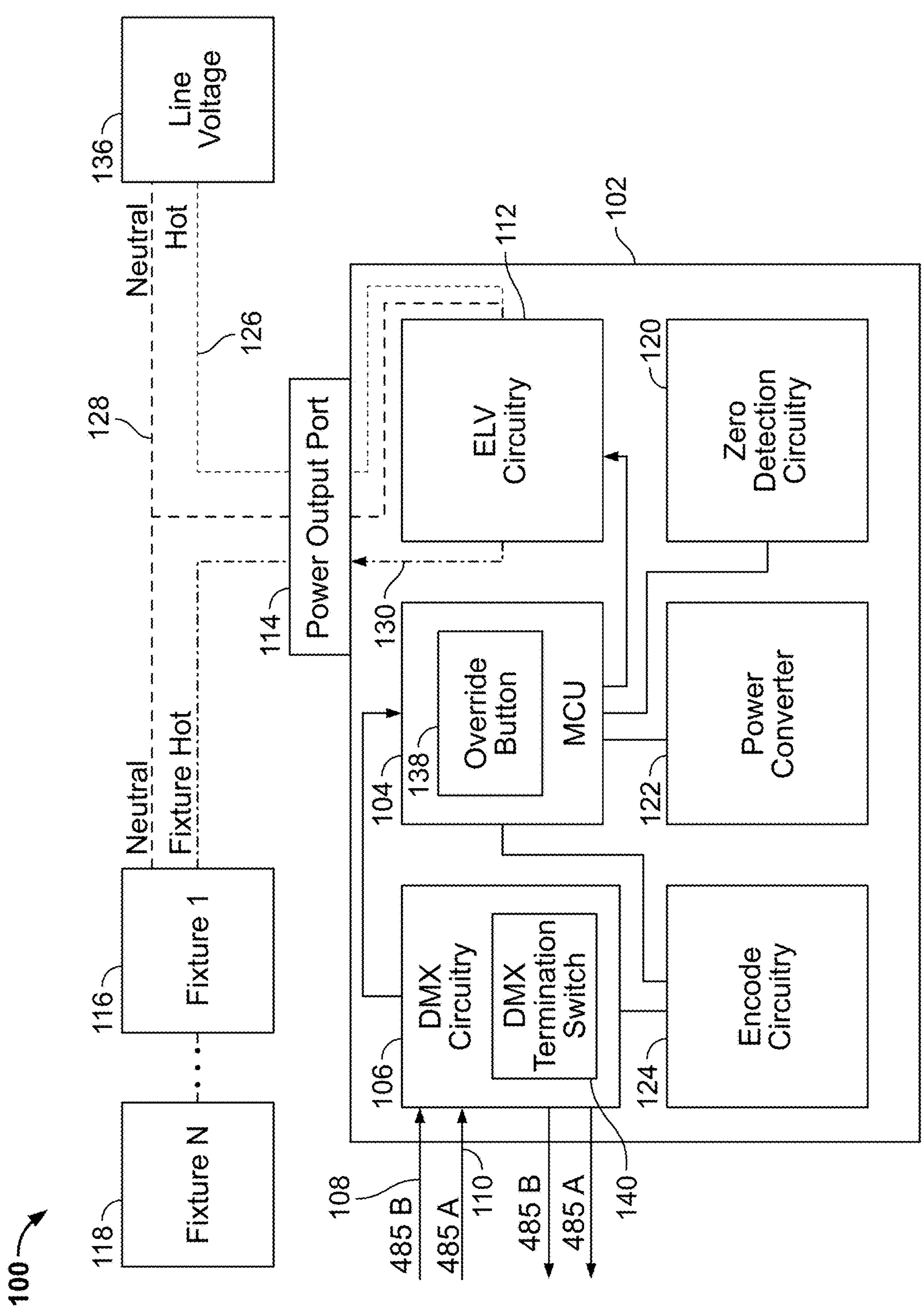
FIG. 1 shows schematically illustrative apparatus in accordance with the principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for dimming light are provided. The apparatus may include a controller unit.

The controller unit may include a lighting power output port. The lighting power output port may output lighting power. The lighting power output port may output lighting power to a fixture. The fixture may include light emitting diode ("LED") light source. The fixture may include a fluorescent light source. The fixture may include an incandescent light source. The fixture may include any suitable light source. The lighting power output port may output lighting power to one or more fixtures.

The controller unit may include a microcontroller. The microcontroller may receive a digital lighting control signal. The digital lighting control signal may be received from digital lighting control circuitry. The digital lighting control signal may be a digital multiplex ("DMX") signal, a digital addressable lighting ("DALI") signal, or any other suitable digital lighting control signal.

The digital lighting control circuitry may receive the digital lighting control signal via digital data lines. The digital lighting control circuitry may receive the digital lighting control signal via only two digital data lines. The digital lighting control circuitry may receive the digital lighting control signal via two or more digital data lines. The digital lines may be included in one or more wires. The digital data lines may transmit the digital lighting control signal to the digital lighting control circuitry via a connector. The digital data lines may be connected to a digital data controller. The digital data lines may transmit the digital lighting control signal from the digital data controller to the digital lighting control circuitry.

The digital data controller may include a remote dimmer. The remote dimmer may include a dimming controller that is not included in the controller unit. The digital data controller may be a digital data controller that is not included in the controller unit. The digital data controller may include a wall dimmer. The digital data controller may include a wireless dimmer. The digital data controller may include a computing device. The computing device may include digital lighting control software.

The digital data controller may receive the light dimming level. The light dimming level may be received from a user. The user may select the light dimming level via a selector. The selector may be a manual selector. The selector may be an electronic selector. The selector may be a wireless selector. The selector may be a remote selector. The selector may be any suitable selector. The selector may include a slider, a dropdown list, preset dimming levels, a switch, or any suitable selector configuration.

The light dimming level may be transmitted from the digital data controller to the digital lighting control circuitry via the digital lighting control signal. The microcontroller may obtain the light dimming level from the digital lighting control signal.

The digital data controller may be a DMX controller. The DMX controller may include 512 individual channels. The DMX controller may include any suitable number of individual channels. Each individual channel may control different lighting parameters of one or more connected light sources. The lighting parameters may include, light color, light intensity, correlated color temperature ("CCT") and any other suitable lighting parameters. Parameters may be selectable by a user. Parameters may be selectable for each connected fixture.

The controller unit may include analog phase cut circuitry. The analog phase cut circuitry may include electric low voltage ("ELV") circuitry. The analog phase cut circuitry may include triode-for-alternating-current ("TRIAC") circuitry. The analog phase cut circuitry may include any suitable analog phase cut circuitry. The microcontroller may transmit the light dimming level to the analog phase cut circuitry. The analog phase cut circuitry may receive the light dimming level. The analog phase cut circuitry may receive line voltage. The line voltage may be nominally 120 VAC. The analog phase cut circuitry may be nominally 220 VAC. The line voltage may be any other suitable AC voltage.

The analog phase cut circuitry may provide lighting power corresponding to the obtained light dimming level. The analog phase cut circuitry may provide lighting power corresponding to the obtained light dimming level to the lighting power output port. The analog phase cut circuitry may provide lighting power corresponding to the obtained light dimming level to the one or more fixtures via the lighting power output port.

The analog phase cut circuitry may provide reverse-phase cut dimming. The analog phase cut circuitry may provide forward-phase cut dimming.

The analog phase cut circuitry may provide lighting power corresponding to the obtained light dimming level by determining a phase angle, relative to an identified zero voltage crossing, at which to receive or discontinue receiving power from the line voltage to reduce the flow of voltage.

The controller unit may include a digital lighting control output circuit. The digital lighting control output circuit may be included in the digital lighting control circuitry. In a first state, the digital lighting control output circuitry may transmit the digital lighting control signal to another controller unit. In a second state, the digital lighting control output circuit may attenuate the digital lighting control signal. In the second state, the digital lighting control output circuit may dissipate the digital lighting control signal.

The controller unit may be configured to be included in a network. The network may include a parallel network. The network may include a serial network. The network may include a hybrid network including both parallel and serial connections. The network may have a daisy chain topology. The network may have a bus topology. The network may have a ring topology. The network may have a mesh topology. The network may have any suitable topology. The network may include one or more other controller units. The one or more other controller units may have one or more features in common with the controller unit. The network may include the controller unit. The network may include one or more other controller units. The network may include one or more other digital lighting control devices. The network may include the digital data controller.

The controller unit may be configured as a terminal controller of the network. The terminal controller may be a controller unit that receives the digital lighting control signal but does not transmit the digital lighting control signal to any other controller units or digital lighting control devices. The controller unit may be configured as a non-terminal controller. A non-terminal controller may be a controller unit that receives and transmits the digital lighting control signal to the one or more other controller units or digital lighting control devices.

In the first state, the digital lighting control output circuit may transmit the digital lighting control signal when the controller unit is the non-terminal controller unit of the network. In the second state, the digital lighting control output circuit may terminate the digital lighting control signal when the controller unit is the terminal controller unit within of the network.

The digital lighting control output circuit may include a switch. The switch may be a manual switch. The switch may be an electronic switch. The switch may be a wireless switch. The switch may be any suitable switch.

The switch may include a first contact. The first contact may be connected to a resistive component. The resistive component may include a resistor, more than one resistor, or any other suitable dissipative components. Table 1 lists illustrative ranges that may include the resistive component value.

TABLE 1

Illustrative resistive component value ranges.

| Illustrative resistive component value ranges (ohms) | |
|---|---|
| Lower | Upper |
| <1 | 50 |
| 50 | 100 |
| 100 | 150 |
| 150 | 200 |
| 200 | 250 |
| 250 | 300 |
| 300 | 350 |
| 350 | 400 |
| 450 | 500 |
| 500 | >500 |
| Other suitable lower limits | Other suitable upper limits |

The resistive component may have a resistance. The resistance of the resistive component may match an impedance of a controller unit. This may substitute for impedance matching effects of a downstream controller unit if the downstream controller unit were connected to the controller unit.

The switch may include a second contact. The first state may be enabled when the switch is closed on the first contact. The second state may be enabled when the switch is closed on the second contact. A user may select between the first state and the second state. The user may close the switch on the first contact. The user may close the switch on the second contact. The user may switch between closing the switch on the first contact and closing the switch on the second contact. The microcontroller may select between the first state and the second state. The switch may be automatically switched between the first contact and the second contact. The switch may be automatically switched between the first contact in response to a signal from the microcontroller. The switch may be automatically switched based on an output of a sensor, a preset algorithm, or any other suitable trigger.

The controller unit may include a mode circuit. The mode circuit may transmit a stored brightness level to the analog phase cut circuitry. The stored brightness level may override any dimming levels previously received by the controller unit from the digital lighting control signal. The mode circuit may transmit the stored brightness level in response to a failure to detect a digital lighting control signal at the microcontroller.

The stored brightness level may be transmitted to the microcontroller. The microcontroller may transmit an analog phase cut dimming level corresponding to the stored brightness level to the analog phase cut circuitry. The analog phase cut circuitry may provide lighting power corresponding to the obtained light dimming level by determining a phase angle, relative to an identified zero voltage crossing, at which to receive or discontinue receiving power from the line voltage to reduce the flow of voltage.

The mode circuit may include a mode switch. The mode switch may include a first position. The mode switch may include a second position. The first position may correspond to a first mode. The second position may correspond to a second mode.

The first mode may correspond to a first lighting setting. The first lighting setting may be transmitted to the analog phase cut circuitry. The second mode may correspond to a second lighting setting. The second lighting setting may be transmitted to the analog phase cut circuitry.

The stored brightness level may be a first stored brightness level. The first lighting setting may include the first stored brightness level. The second lighting setting may include a second stored brightness level.

The mode switch may include an electronic actuator. The electronic actuator may include wireless control. The electronic actuator may include digital control. The electronic actuator may include a touchscreen. The touchscreen may be used to control the electronic actuator.

The mode switch may include a mechanical actuator. The mechanical actuator may include a pushbutton. The mechanical actuator may include any suitable button. The mechanical actuator may include a dial. The mechanical actuator may include a slider. The mechanical actuator may include any suitable mechanical toggle.

The mode circuit may be toggled between the first mode and the second mode. The mode circuit may toggle between the first mode and the second mode in response to the mode switch being pressed. The mode switch may be pressed by a user. The mode switch may be pressed by a user to override a light dimming level set by the digital lighting control signal. The mode switch may be pressed in response to a detection of a failure within the digital lighting control signal.

In response to the mode switch being pressed a first time, the mode circuit may be in the first mode. In the first mode, the mode circuit may transmit the first stored brightness to the analog phase circuitry. In response to the mode switch being pressed a second time, the mode circuit may be in the second mode. In the second mode, the mode circuit may transmit the second stored brightness to the analog phase circuitry. The second stored brightness may be different from the first stored brightness.

The first stored brightness may include a first percentage of power available for each light source. The second stored brightness may include a second percentage of power available for each light source. Table 2 may include illustrative ranges that may include the first percentage and the second percentage.

TABLE 2

Illustrative ranges that may include the first percentage and the second percentage.

| Illustrative ranges | |
|---|---|
| Lower | Upper |
| 0% | 20% |
| 20% | 40% |
| 40%% | 60% |
| 60% | 80% |
| 80% | 100% |
| 100% | >100% |
| Other suitable lower limits | Other suitable upper limits |

The first and second stored brightness levels may be selected by the user. The user may select the first and second stored brightness levels using a software application. The software application may include a graphical user interface. The user may select the first and second stored brightness levels using a selector included in the software application. The first and second stored brightness levels may be preset brightness levels. The first and second stored brightness levels may be factory set brightness levels.

The mode switch may include a plurality of modes. The mode switch may include a third mode. The third mode may correspond to a third lighting setting. The third lighting setting may include a third stored brightness level. The third stored brightness level may be a brightness level that is in between the brightness level of the first stored brightness level and the brightness level of the second stored brightness level. The mode circuit may toggle between the first mode, the second mode and third mode in response to the mode switch being pressed. The third mode may include one or more other modes. Each mode may correspond to a stored brightness level.

The mode switch may be included in the microcontroller. The mode switch may be a software switch.

The mode circuit may automatically transmit the first stored brightness level in response to a failure to detect the digital lighting control signal at the microcontroller. The mode circuit may automatically transmit the second stored brightness level in response to a failure to detect the digital lighting control signal at the microcontroller. The mode circuit may automatically transmit the third stored brightness level in response to a failure to detect the digital lighting control signal at the microcontroller.

The mode circuit may toggle between the first mode, the second mode and the third mode in response to receiving a switching instruction from the microcontroller. The switching instruction may be an automatic switching instruction. The switching instruction may be triggered by a switching command received from a user. The switching command may be received from the user via the software application. The switching instruction may be triggered by a sensor The sensor may monitor data transmission via the digital lighting control signal.

In some embodiments the controller unit may include a digital multiplex ("DMX") dimming channel. The channel may be a dimming output channel. The DMX channel may be a dimming input channel. The controller unit may include any suitable number of DMX channels. Each of the channels may correspond to a light source or a string of light sources in one or more lighting modules. The lighting modules may include one or more light sources. Each of the DMX channels may be controlled separately. Each of the one or more light sources included in the lighting modules may be controlled separately. The one or more light sources may be dimmed using DMX dimming. The one or more light sources may be dimmed using ELV dimming. The one or more light sources may be dimmed using any suitable dimming.

The controller unit may be configured to receive from a dimmer an electric low voltage ("ELV") dimming input. The controller unit may be configured to receive from the dimmer a DMX dimming input. The dimmer may be a wall switch. The wall switch may be an electronic switch. The wall switch may be any suitable switch.

ELV dimming may include reverse-phase cut dimming. Reverse phase-cutting may include modulating input power by turning the light sources ON in the beginning of an AC wave and turning the light sources OFF at a trailing edge of each wave. In order to increase the light output, the power may be turned OFF at a later time period within the trailing edge; and to decrease the light output, the power may be turned OFF at an earlier time period within the trailing edge.

The controller unit may receive the ELV input dimming signals. The controller unit may output ELV dimming signals. The controller unit may translate the ELV dimming signals into DMX dimming signals. The DMX dimming signals may correspond to the input ELV dimming signals. The controller unit may translate the DMX dimming signals into ELV dimming signals. The ELV dimming signals may correspond to the DMX dimming signals. The ELV signal may include the same brightness level as the DMX dimming signals.

The dimming signals may be transmitted to the light source module or modules via low voltage control signals. The low voltage control signals may be included in a protocol. The protocol may regulate the voltage transmitted to the light sources. By regulating the voltage, the power being supplied to the light sources may in turn be modulated. Less power being modulated may decrease the intensity of the light sources. More power being modulated may increase the intensity of the light sources. The output light emitted by the light sources may correspond to the input dimming level transmitted through the ELV dimming signal. The output light emitted by the light sources may correspond to the input dimming level transmitted through the DMX dimming signal.

The controller unit may control the light dimming level of one or more connected light modules. The lighting modules may include incandescent light sources, fluorescent light sources, halogen light sources, LED light sources and any other suitable light sources. The controller unit may receive a DMX dimming signal. The DMX dimming signal may be a digital lighting control signal. The one or more light modules may be configured to receive power from an analog dimmable power source. The analog dimmable power source may include ELV dimming, TRIAC dimming, 0-10V dimming, 0-5V dimming and any other suitable analog dimming.

The controller unit may be configured to receive, from a dimmer, a DMX dimming input. The dimmer may be included in the digital data controller. The DMX dimming input may be a single-channel DMX input. The single-channel input may be included in a DMX data packet that includes only a dimming level. The controller unit may be configured to translate the DMX dimming input to an ELV dimming output. The controller unit may transmit the ELV dimming output to one or more light source modules connected to the controller unit. The one or more light source modules may be included in one or more fixtures. The ELV dimming output may correspond to the DMX dimming input.

The controller unit may be configured to receive from the dimmer a plurality of DMX dimming inputs. The plurality of DMX dimming inputs may be single-channel DMX inputs. The controller unit may be configured to translate each DMX dimming input included in the plurality of DMX dimming inputs to a corresponding ELV dimming output.

The DMX dimming signal may be transmitted from one or more DMX512-A control sources. The DMX dimming signal may be transmitted from any other suitable DMX control sources. The controller unit may include RJ45 DMX T-568B Ports (IN & OUT). The controller unit may receive the DMX signal through the RJ45 DMX T-568B Ports (IN & OUT). The controller unit may receive the DMX signal through any other suitable port.

The controller unit may operate in conformance with a remote device management ("RDM") protocol. The RDM protocol may enable remote configuration and DMX address setting using a remote RDM controller. The remote RDM controller may be used to remotely set the DMX starting address of the controller unit. When set using RDM, the DMX starting address may override any previously set DMX starting address of the controller unit. The RDM controller may set the remote DMX starting address of the controller unit using a serial number and RDM ID of the controller unit.

The controller unit may include a dimming curve adjustment control. The dimming curve adjustment control may include a dial. The dial may include a rotary dial. The dimming curve adjustment control may be used to customize a dimming curve. The dimming curve adjustment control may have any suitable number of set positions. Each position on the control may correspond to a preset dimming curve. A user may select a position corresponding to a desired dimming curve. The controller unit may emit light at a light dimming level corresponding to the selected dimming curve.

The controller unit may include a DMX address setting control. The DMX address setting control may include a plurality of dials. The plurality of dials may include a plurality of rotary dials. Each rotary dial may have any suitable number of set positions. Each position may have a corresponding number. A DMX address may be set by positioning each rotary dial at a specific position. The DMX address may include a combination of the numbers corresponding to the selected position of each of the plurality of dials. The DMX address may range from 001 to 512. The DMX address may range between any other suitable value. The DMX address may include any suitable range. A DMX address set through an RDM controller may overwrite a DMX address set by the DMX address setting control.

The controller unit may be included in a serial network with one or more other DMX devices. The serial network may have a daisy chain topology. The controller unit may be coupled at the end of the daisy chain network. The controller unit may not be coupled at the end of the daisy chain network. The controller unit may include a DMX termination switch. The DMX termination switch may be included in the digital lighting control output circuitry. A first setting of the DMX termination switch may apply any suitable amount of resistance to terminate the DMX. The amount of Ohms may be any suitable amount of resistance. The first setting of the DMX termination switch may include any suitable method to terminate the DMX. The first setting of the DMX switch may correspond to the second state. A second setting of the DMX termination switch may not terminate the DMX signal. The second setting may correspond to the first state. The DMX termination switch may include any suitable number of settings.

When the controller unit is not configured to be coupled at the end of the daisy chain, the DMX termination switch may be set on the second setting. The DMX termination switch may be set on the second setting to enable the DMX signal to be transmitted to the one or more other DMX devices included in the serial network.

When the controller unit is configured to be coupled at the end of the daisy chain, the DMX termination switch may be set on the first setting. The DMX termination switch may be set on the first setting to terminate the DMX signal.

The controller unit may include an override button. The override button may be included in the mode circuit. The override button may be used to manually turn the output of connected light modules on or off in an event of DMX signal interruption or a signal loss. The override button may include a first mode. The first mode may illuminate all connected light modules at any suitable value between 0% brightness and 100% brightness. The first mode may illuminate all connected light modules at any suitable light dimming level. The override button may include a second mode. The second mode may dim all connected light modules at any suitable brightness between 0% brightness and 100% brightness. The second mode may dim all connected light modules to any suitable light dimming level.

The override button may alternate between the first mode and the second mode in response to a pressing of the override button. The override button may alternate between any suitable number of modes. The override button may alternate between the modes in response to a pressing of the override button. Once DMX is restored, the light dimming level of all the connected light modules may be restored to the light dimming level included in the DMX signal. Once DMX is restored, the light dimming level of all the connected light modules may automatically be restored to the light dimming level included in the DMX signal.

The controller unit may be operable in the context of centralized DMX control integration via a DMX gateway. The DMX gateway may include a gateway such as that available from Wangs Alliance Corporation, Port Washington, New York, under the trade name ABiCUS DMX gateway.

Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the methods associated therewith.

FIG. 1 shows illustrative architecture 100 for dimming light. Controller unit 102 may include DMX circuitry 106. DMX circuitry 106 may include any suitable digital lighting control circuitry. DMX circuitry 106 may receive DMX data via DMX data lines 108 and 110. DMX data may include a light dimming level. DMX data may include light color. DMX data may include a color correlated temperature ("CCT"). DMX data may be received from a DMX controller (not shown). The DMX controller may include a user interface. A user may select an dimming level, color, CCT and any other suitable light parameters. The DMX controller may transmit the DMX data via DMX data lines 108 and 110.

Controller unit 102 may include microcontroller 104. Microcontroller 104 may be powered by power converter 122. Power converter 122 may convert voltage received from line voltage 136 to DC voltage. Power converter 122 may power DMX circuitry 106, encode circuitry 124 and zero detection circuitry 120. Microcontroller 104 may receive the DMX data from DMX circuitry 106. Microcontroller 104 may obtain a light dimming level from the DMX data.

Microcontroller 104 may transmit the light dimming level to ELV circuitry 112. ELV circuitry 112 may include any suitable analog phase cut circuitry. ELV circuitry 112 may receive power from line voltage 136. ELV circuitry 112 may receive power from line voltage 136 via hot wire 126 and neutral wire 128. ELV circuitry 112 may reduce a flow of the power of the line voltage at a trailing end of each wave of line voltage 136. ELV circuitry 112 may determine how much to reduce the flow of voltage based on the light dimming level transmitted from microcontroller 104. ELV circuitry 112 may determine a time within the wave at which to start reducing the flow of voltage based on the light dimming level transmitted from microcontroller 104.

Controller unit 102 may include zero detection circuitry 120. Zero detection circuitry 120 may monitor the waves from the flow of voltage entering ELV circuitry 112. Zero detection circuitry 120 may detect when a wave crosses a zero-voltage level. Zero detection circuitry 120 may detect when a potential of a wave crosses zero voltage. Zero detection circuitry 120 may identify a reference time for ELV circuitry 112. The reference time may be determined by an identification of zero-voltage crossings. ELV circuitry 112 may determine a phase angle, relative to the zero-voltage crossing, at which to receive or discontinue receiving power from line voltage 136 to reduce the flow of voltage based on the reference time. ELV circuitry 112 may identify a trailing end of each wavelength based on the reference time. Zero detection circuitry 120 may identify when to start reducing the flow of voltage. Zero detection circuitry 120 may identify when to start reducing the flow of voltage based on the light dimming level received at microcontroller 104.

ELV circuitry 112 may output power to fixtures 116 through 118. Fixtures 116 through 118 may include any suitable amount of fixtures. Fixtures 116 through 118 may be connected to neutral wire 128. ELV circuitry 112 may output power to fixtures 116 through 118 via power output port 114. ELV circuitry 112 may output power to fixtures 116 through 118 via fixture hot wire 130. The power may correspond to the light dimming level selected at the DMX controller.

Controller unit 102 may be included in a network of controller units (not shown). The controller unit may transmit the DMX data to another controller unit via DMX data lines 108 and 110. DMX circuitry 106 may include DMX termination switch 140. DMX termination switch 140 may have one or more features in common with the digital lighting control output circuit. DMX termination switch 140 may include a first setting and a second setting. The first setting may enable DMX data to be transmitted to other controller units. The second setting may attenuate the transmission of the DMX data.

Controller unit 102 may be configured as a terminal controller unit when there are no controller units to which DMX data may be transmitted. When controller unit 102 is configured as a terminal controller unit within the network, DMX termination switch 140 may be set on the second setting. DMX termination switch 140 may include a resistor. The resistor may have any suitable value included in the ranges listed in Table 1. In the second setting, DMX termination switch 140 may complete a circuit with DMX data line 108, DMX data line 110 and the resistor. The resistor may create an impedance. The impedance may be equivalent or substantially equivalent to impedance generated from another controller unit. The impedance may attenuate the DMX signal. This may reduce or avoid reflection of the DMX signal back on DMX data lines 108 and 110.

Controller unit 102 may be configured a non-terminal controller unit when there is a controller unit to which DMX data can be transmitted. When controller unit 102 is configured as a non-terminal controller unit within the network, DMX termination switch 140 may be set on the first setting. In the first setting DXM data may be transmitted to the other microcontroller via DMX data lines 108 and 110.

DMX termination switch 140 may include a manual switch. DMX termination switch 140 may include an electronic switch. DMX termination switch 140 may include any suitable switch. A user may toggle DMX termination switch 140 between the first setting and the second setting. DMX termination switch 140 may be automatically toggled between the first setting and the second setting.

Microcontroller 104 may include override button 138. Override button 138 may have one or more features in common with the mode circuit. Override button 138 may transmit a stored brightness level to ELV circuitry 112. Override button 138 may transmit the stored brightness level to ELV circuitry 112 when there is no DMX data being transmitted to microcontroller 104. The stored brightness may include a first stored brightness and a second stored brightness. Override button 138 may toggle between transmitting the first stored brightness and the second stored brightness to ELV circuitry 112 in response to a pressing of override button 138.

Figure 2:
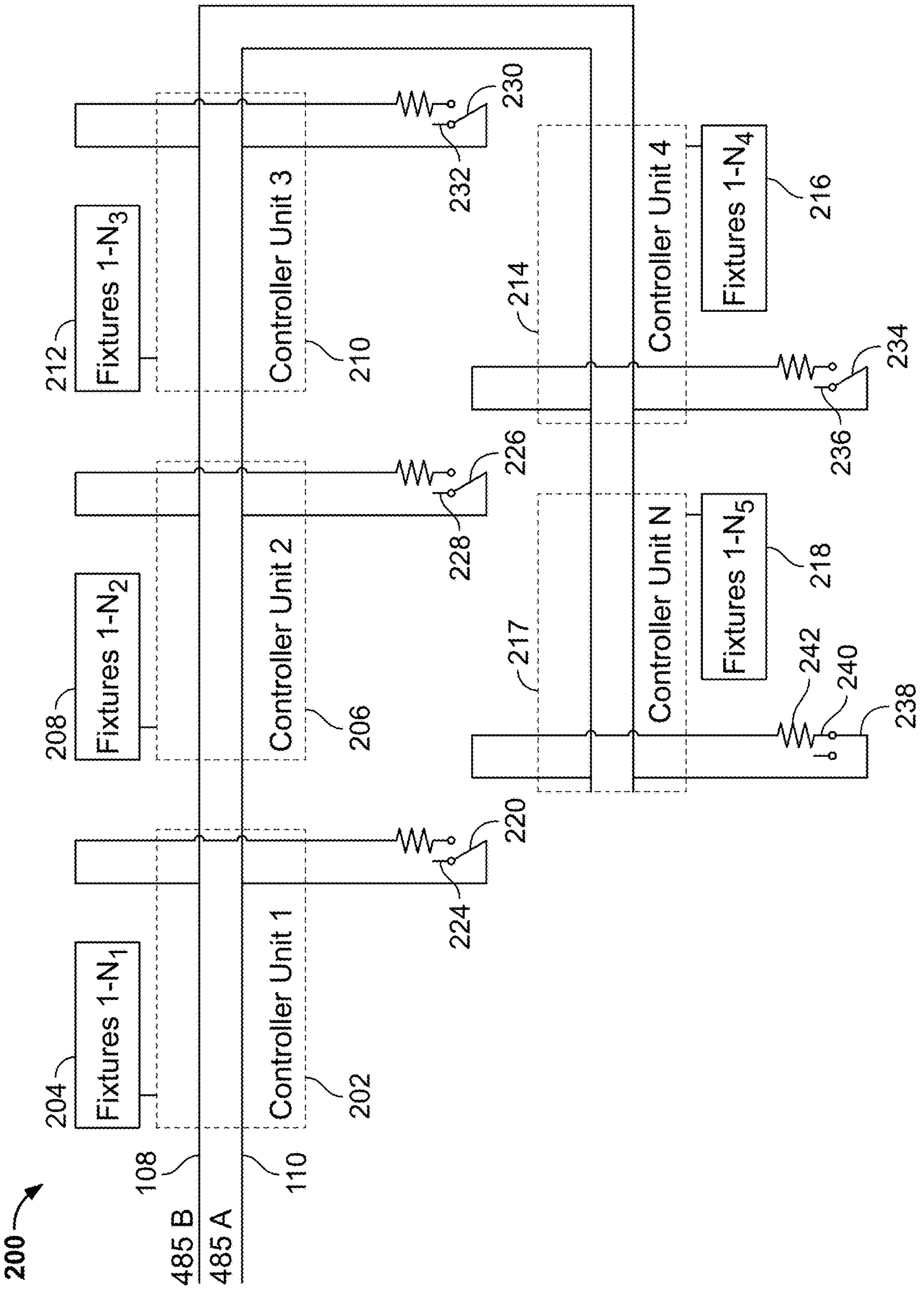
FIG. 2 shows illustrative apparatus in accordance with the principles of the invention.

FIG. 2 shows illustrative network 200 for dimming light. Network 200 may be a network including controller units 202, 206, 210, 214 and 217. Network 200 may be a network that includes any suitable number of controller units or any other suitable network components. Controller units 202, 206, 210, 214 and 217 may have one or more features in common with controller unit 102.

Controller unit 202 may provide power to fixtures 204. Fixtures 204 may include any suitable number of fixtures from fixture 1 to fixture $N_1$. Controller unit 206 may provide power to fixtures 208. Fixtures 208 may include any suitable number of fixtures from fixture 1 to fixture $N_2$. Controller unit 210 may provide power to fixtures 212. Fixtures 212 may include any suitable number of fixtures from fixture 1 to fixture $N_3$. Controller unit 214 may provide power to fixtures 216. Fixtures 216 may include any suitable number of fixtures from fixture 1 to fixture $N_4$. Controller unit 217 may provide power to fixtures 218. Fixtures 218 may include any suitable number of fixtures from fixture 1 to fixture $N_5$. Fixtures 204, 208, 212, 216, and 218 may have one or more features in common with one or more of fixtures 116 through 118.

Controller units 202, 206, 210, 214 and 217 may receive DMX data. Controller units 202, 206, 210, 214 and 217 may receive DMX data via DMX data lines 108 and 110. DMX data lines 108 and 110 may include a chain of data lines between each controller unit.

Controller unit 202 may be a first controller unit in network 200. Controller unit 202 may receive the DMX data from a DXM controller (not shown). Controller unit 202 may include DMX termination switch 220. DMX termination switch 220 may have one or more features in common with DMX termination switch 140. DMX termination switch 220 may be disposed inside controller unit 202. Controller unit 202 may transmit DMX data to controller unit 206. Because controller unit 202 may transmit DMX data to controller unit 206, controller unit 202 may be set as a non-terminal controller unit. Setting controller unit 202 as non-terminal controller unit, may include setting DMX termination switch 220 on pole 224. DMX termination switch 220 may be connected to DMX data lines 108 and 110. When DMX termination switch 220 is set on pole 224, the DMX data may be transmitted to controller unit 206.

Controller unit 206 may receive the DMX data from controller unit 202. Controller unit 206 may include DMX termination switch 226. DMX termination switch 226 may have one or more features in common with one or more of DMX termination switches 140 and 220. DMX termination switch 226 may be disposed inside controller unit 206. Controller unit 206 may transmit DMX data to controller unit 210. Because controller unit 206 may transmit DMX data to controller unit 210, controller unit 206 may be set as a non-terminal controller unit. Setting controller unit 206 as a non-terminal controller unit may include setting DMX termination switch 226 on pole 228. DMX termination switch 226 may be connected to DMX data lines 108 and 110. When DMX termination switch 226 is set on pole 228, the DMX data may be transmitted to controller unit 210.

Controller unit 210 may receive the DMX data from controller unit 206. Controller unit 210 may include DMX termination switch 230. DMX termination switch 230 may have one or more features in common with one or more of DMX termination switches 140, 220 and 226. DMX termination switch 230 may be disposed inside controller unit 210. Controller unit 210 may transmit DMX data to controller unit 214. Because controller unit 210 may transmit DMX data to controller unit 214, controller unit 210 may be set as a non-terminal controller unit. Setting controller unit 210 as a non-terminal controller unit may include setting DMX termination switch 226 on pole 228. DMX termination switch 230 may be connected to DMX data lines 108 and 110. When DMX termination switch 230 is set on pole 232, the DMX data may be transmitted to controller unit 214.

Controller unit 214 may receive the DMX data from controller unit 210. Controller unit 214 may include DMX termination switch 234. DMX termination switch 234 may have one or more features in common with one or more of DMX termination switches 140, 220, 226 and 230. DMX termination switch 234 may be disposed inside controller unit 214. Controller unit 214 may transmit DMX data to controller unit 217. Because controller unit 214 may transmit DMX data to controller unit 217, controller unit 214 may be set as a non-terminal controller unit. Setting controller unit 214 as a non-terminal controller unit may include setting DMX termination switch 234 on pole 236. DMX termination switch 234 may be connected to DMX data lines 108 and 110. When DMX termination switch 234 is set on pole 236, the DMX data may be transmitted to controller unit 217.

Controller unit 217 may receive the DMX data from controller unit 214. Controller unit 217 may include DMX termination switch 238. DMX termination switch 238 may have one or more features in common with one or more of DMX termination switches 140, 220, 226, 230 and 234. DMX termination switch 238 may be disposed inside controller unit 217 Controller unit 217 may not transmit DMX data. Because controller unit 217 may not transmit DMX data, controller unit 217 may be set as a terminal controller unit. Setting controller unit 217 as a terminal controller unit may include setting DMX termination switch 238 on pole 240. Pole 240 may be connected to resistor 242. Resistor 242 may have any suitable value as listed in Table 1. When DMX termination switch 238 is set on pole 240, the DMX data may be attenuated. The resistance of resistor 242 may be equal or substantially equal to an impedance that would be created if there were another controller unit connected after controller unit 217.

Figure 3:
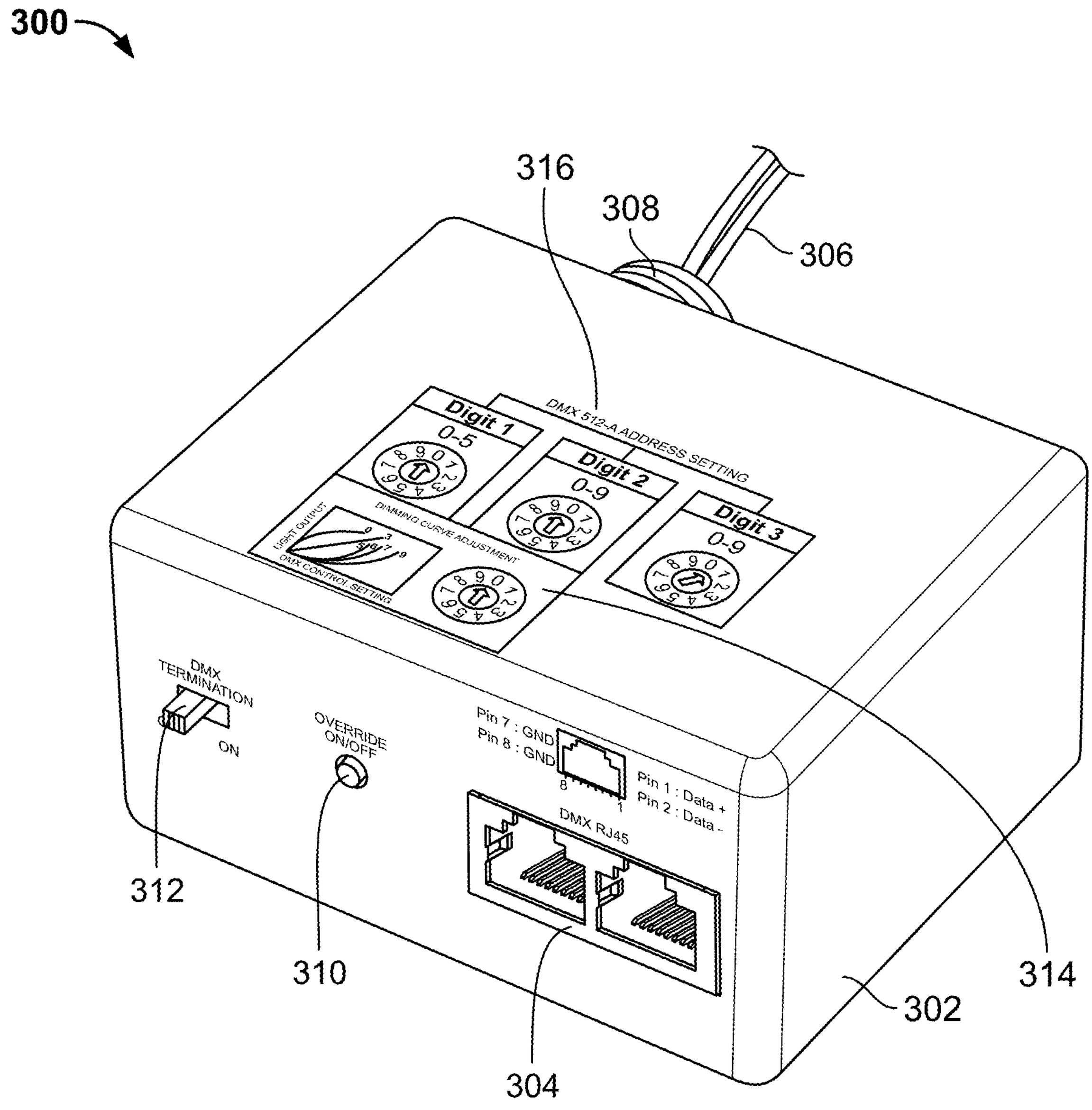
FIG. 3 shows illustrative apparatus in accordance with the principles of the invention.

FIG. 3 shows illustrative controller unit 300. Controller unit 300 may have one or more features in common with one or more of controller units 100, 202, 206, 210, 214 and 217.

Controller unit 300 may include housing 302. The housing may include plastic, medal or any other suitable material.

Controller unit 300 may include one or more DMX data ports 304. DMX data ports 304 may receive DMX data connectors (not shown). The DMX data connectors may be connected DMX data lines (not shown). The DMX data lines may be connected to a DMX controller (not shown). DMX data may be transmitted from the DMX controller through the DMX data lines into controller unit 300 via the DMX data connectors and DMX data ports 304.

Controller unit 300 may include DMX termination switch 312. DMX termination switch 312 may have one or more features in common with one or more of DMX termination switches 140, 220, 226, 230, 234 and 238. Controller unit 300 may include override button 310. Override button 310 may have one or more features in common with override button 138.

Controller unit 300 may include DMX address setting dials 316. Controller unit 300 may include dimming curve adjustment 314. DMX address setting dials 316 and dimming curve adjustment 314 may have one or more features in common with encode circuitry 124.

Controller unit 300 may include power output port 308. Power output port 308 may have one or more features in common with power output port 114. Power output port 308 may be threaded. Power output port may be threaded to receive a fixture.

Controller unit 300 may include power leads 306. Power leads 306 may include one or more features in common with one or more of hot wire 126, neutral wire 128 or fixture hot wire 130. Power leads 306 may provide power to controller unit 300. Power leads 306 may provide power to one or more connected fixtures.

Figure 4:
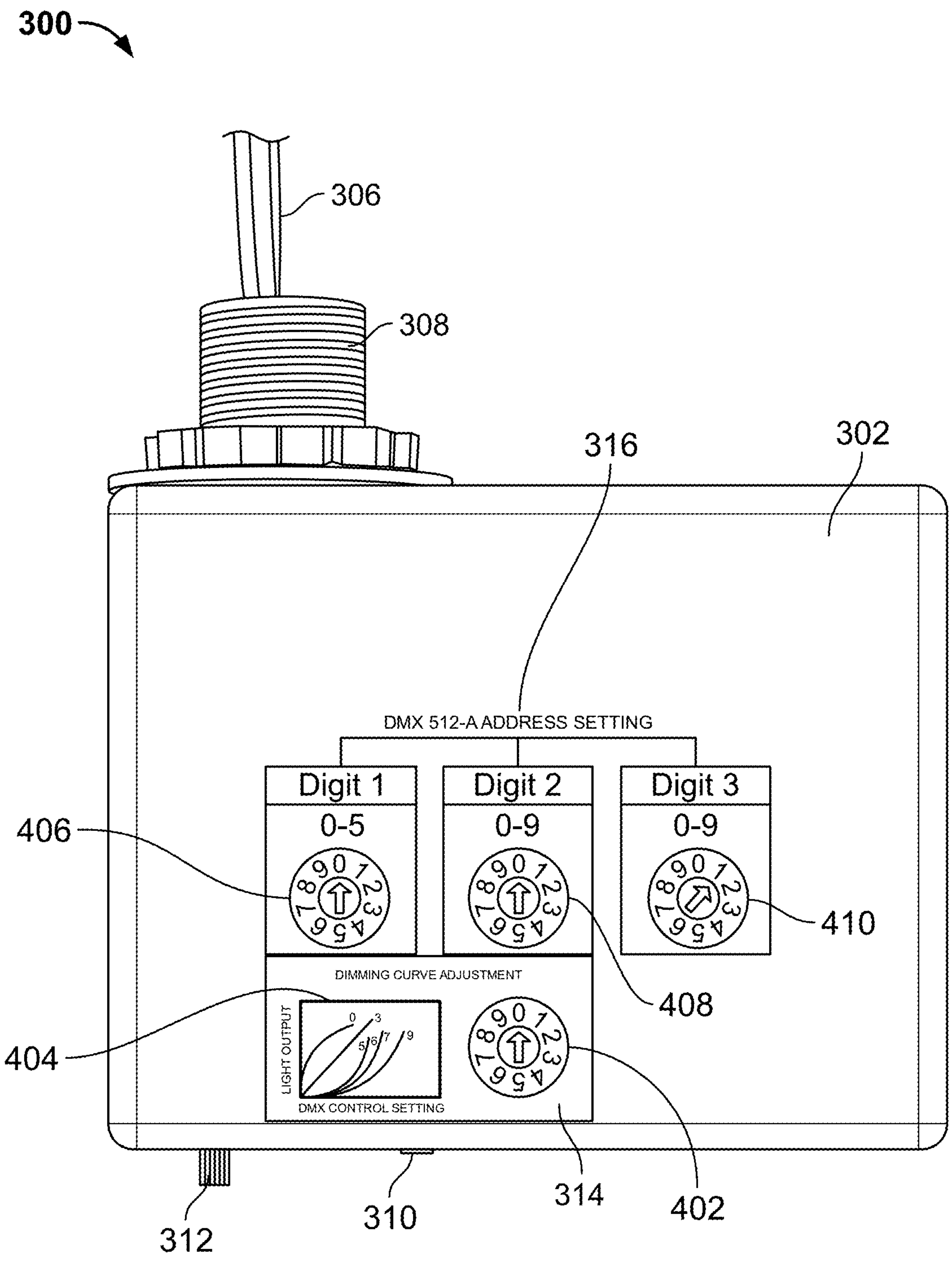
FIG. 4 shows illustrative apparatus in accordance with the principles of the invention.

FIG. 4 shows a side view of controller unit 300.

DMX address setting dials 316 may include rotary dials 406, 408 and 410. Each rotary dial 406, 408 and 410 may have ten suitable number of set positions. Each rotary dials 406, 408 and 410 may have any suitable number of set positions. Each position may have a corresponding number. A DMX address may be set by positioning each rotary dial 406, 408 and 410 at a specific position. The DMX address may include a combination of the numbers corresponding to the selected position of each of rotary dial 406, 408 and 410.

DMX dimming curve adjustment 314 may include rotary dial 402. Rotary dial 402 may have ten set positions. Rotary dial 402 may have suitable number of set positions. Each position may have a corresponding number. Each number may correspond to a stored dimming curve. The stored dimming curves may be preset dimming curves. The stored dimming curves may be user selected dimming curves. The stored dimming curves may be displayed on dimming curve display 404. Dimming curve display 404 may be an electronic display. Dimming curve display 404 may not be an electronic display.

Figure 5:
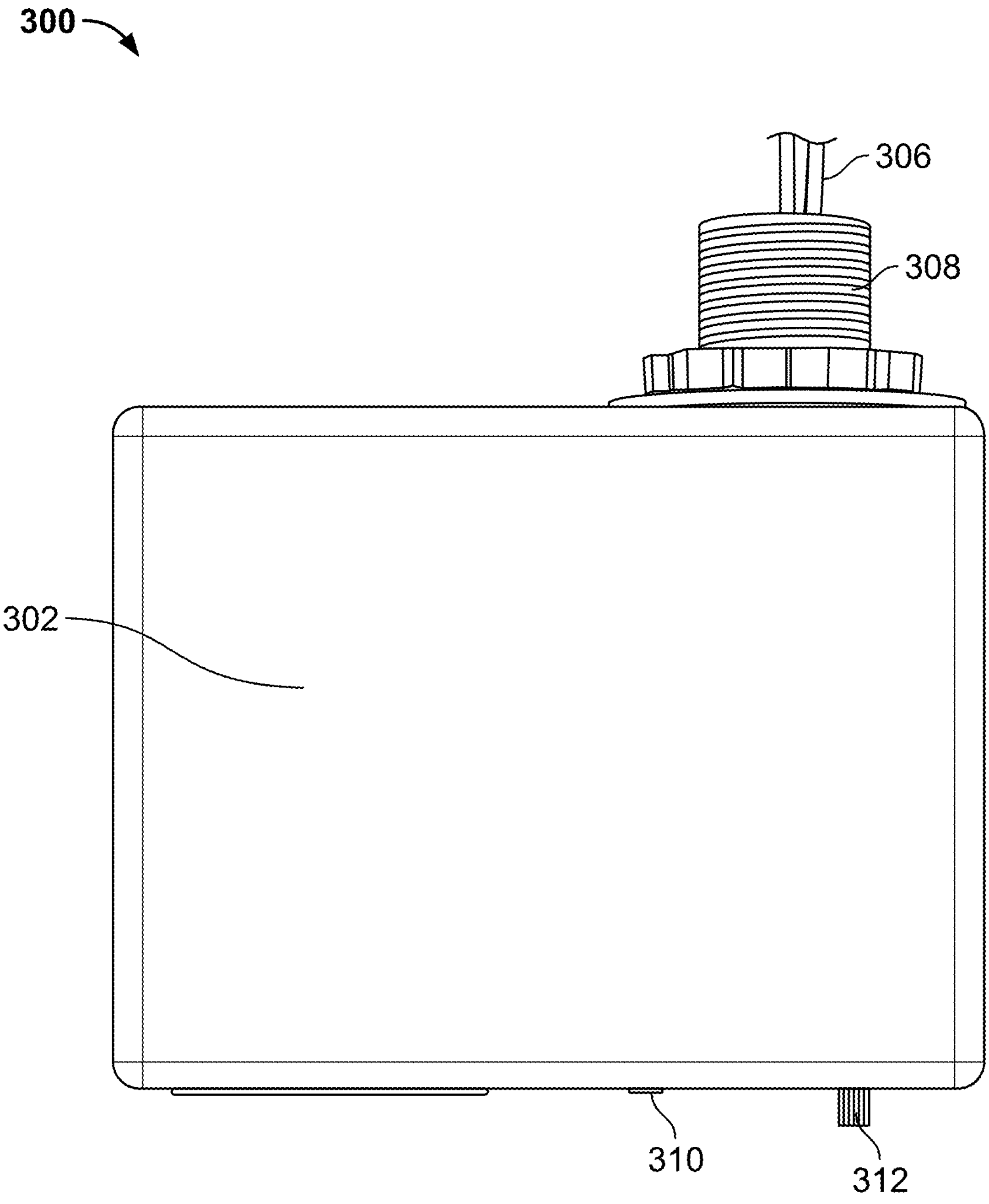
FIG. 5 shows illustrative apparatus in accordance with the principles of the invention.

FIG. 5 shows a bottom view of controller unit 300.

Figure 6:
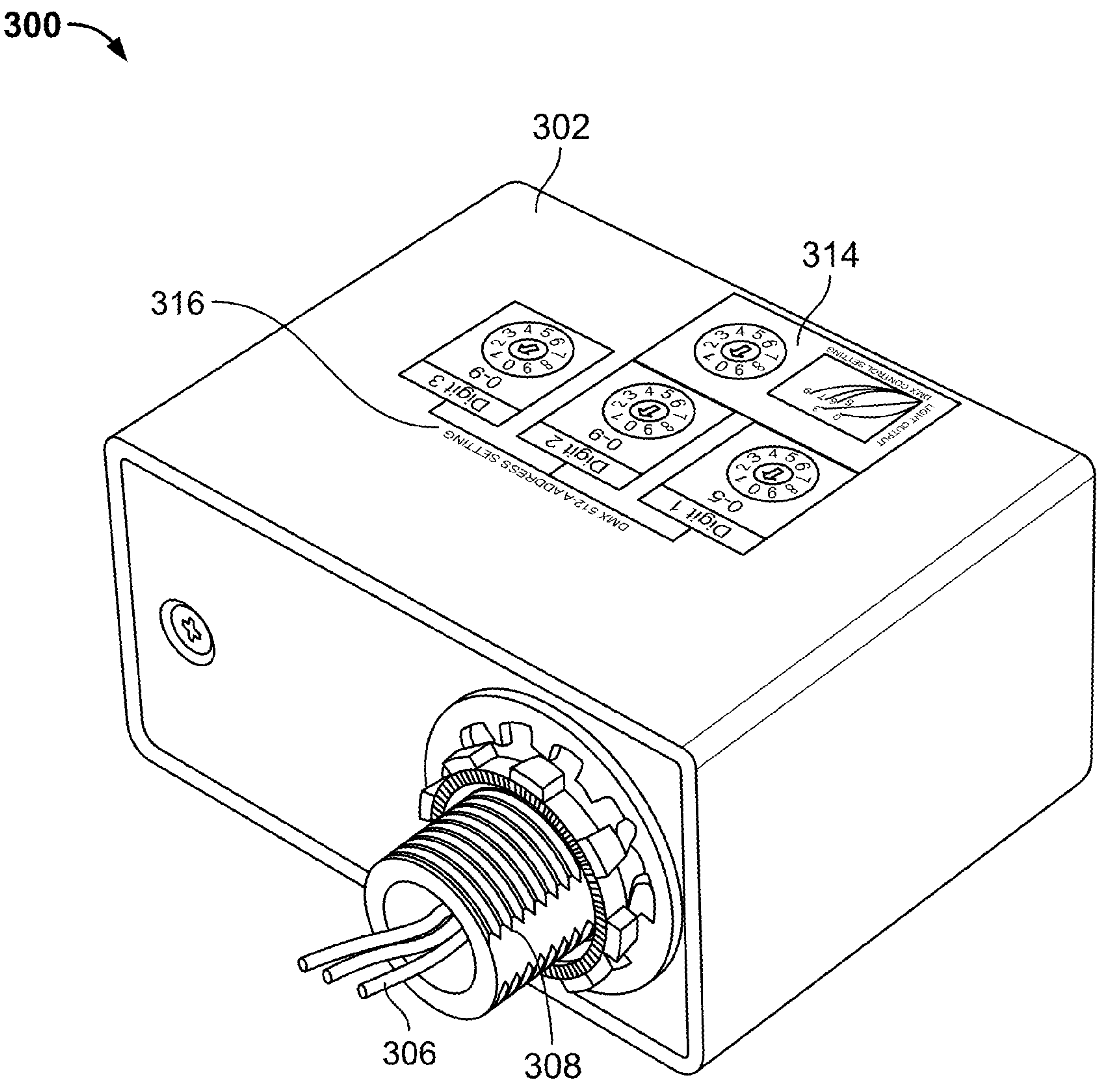
FIG. 6 shows illustrative apparatus in accordance with the principles of the invention.

FIG. 6 shows another view of controller unit 300.

Figure 7:
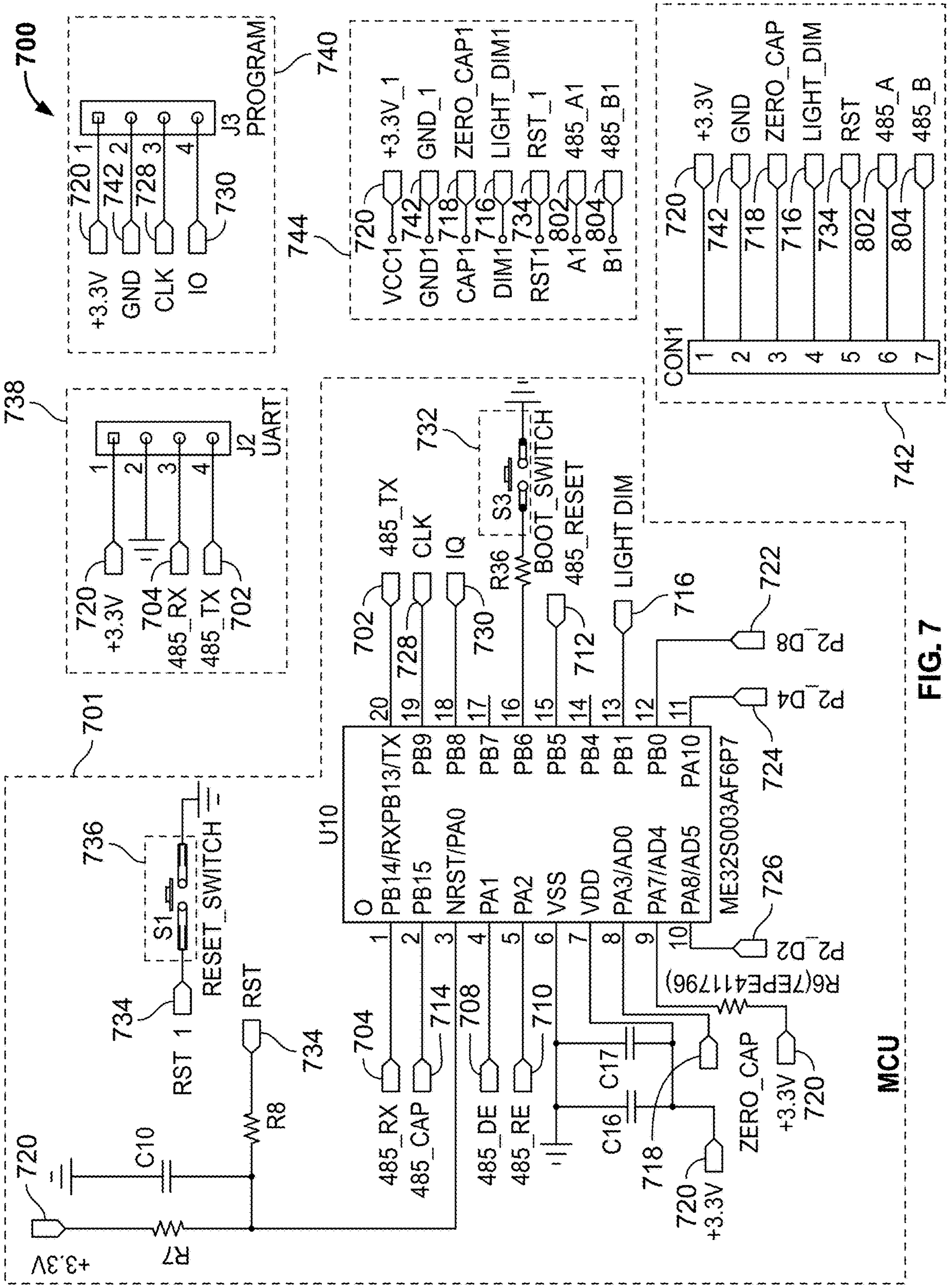
FIG. 7 shows schematically illustrative apparatus in accordance with the principles of the invention.

FIG. 7 shows illustrative controller unit circuitry 700. Controller unit circuitry 700 may include one or more features in common with architecture 100. Controller unit circuitry 700 may include microcontroller 701. Microcontroller 701 may have one or more features in common with microcontroller 104.

Microcontroller 701 may translate a DMX signal to a corresponding ELV dimming signal. Microcontroller 701 may receive DMX data via terminal 704 (485_RX). Microcontroller 701 may be in electronic communication with DMX circuitry 703 via terminal 702 (485_TX), terminal 708 (485_DE), terminal 710 (485_RE), terminal 712 (485_RESET) and terminal 714 (485_CAP).

Microcontroller 701 may identify a light dimming level included in the DMX signal. Microcontroller 701 may translate the identified light dimming level to an ELV dimming level. Microcontroller 701 may output the ELV dimming level. Microcontroller 701 may output the ELV dimming level to ELV circuitry 705 via terminal 716 (LIGHT_DIM).

Microcontroller 701 may receive input voltage 720. Input voltage 720 may be 3.3 VDC. Input voltage 720 may be received from power converter 711. Input voltage 720 may power microcontroller 701.

Microcontroller 701 may be in electronic communication with zero cross detection circuitry 707 via terminal 718 (ZERO_CAP). Microcontroller 701 may in electronic communication with encode circuitry via terminal 722 (P2_D8), terminal 724 (P2_D4), and terminal 726 (P2_D2).

Microcontroller 701 may be connected to a clock signal via terminal 728 (CLK) and terminal 730 (IQ).

Microcontroller 701 may include switch 732. Switch 732 may include a pushbutton. Switch 732 may have one or more features in common with override button 138. In response to a pushing of switch 732, microcontroller 701 may provide a first stored brightness level to ELV circuitry 705. Microcontroller 701 may provide the first stored brightness level to ELV circuitry 705 via terminal 716 (LIGHT DIM). In response to a second pushing of switch 732, microcontroller 701 may provide a second stored brightness level to ELV circuitry 705. Microcontroller 701 may provide the second stored brightness level to ELV circuitry 705 via terminal 716 (LIGHT DIM). Switch 732 may be pushed by a user. Switch 732 may be pushed automatically. Switch 732 may be pushed in response to receiving a switching signal at microcontroller 701.

Switch 732 may be used in when DMX data is not being transmitted to microcontroller 701. Switch 732 may be a manual switch. Switch 732 may be an electronic switch. Switch 732 may be any suitable switch.

Microcontroller 701 may include reset switch 736. Reset switch 736 may be in electronic communication with microcontroller 701 via terminal 734 (RST). Reset switch 736 may be used to reset microcontroller 701.

Controller unit circuitry 700 may include connectors 738, 740, 742 and 744.

Figure 8:
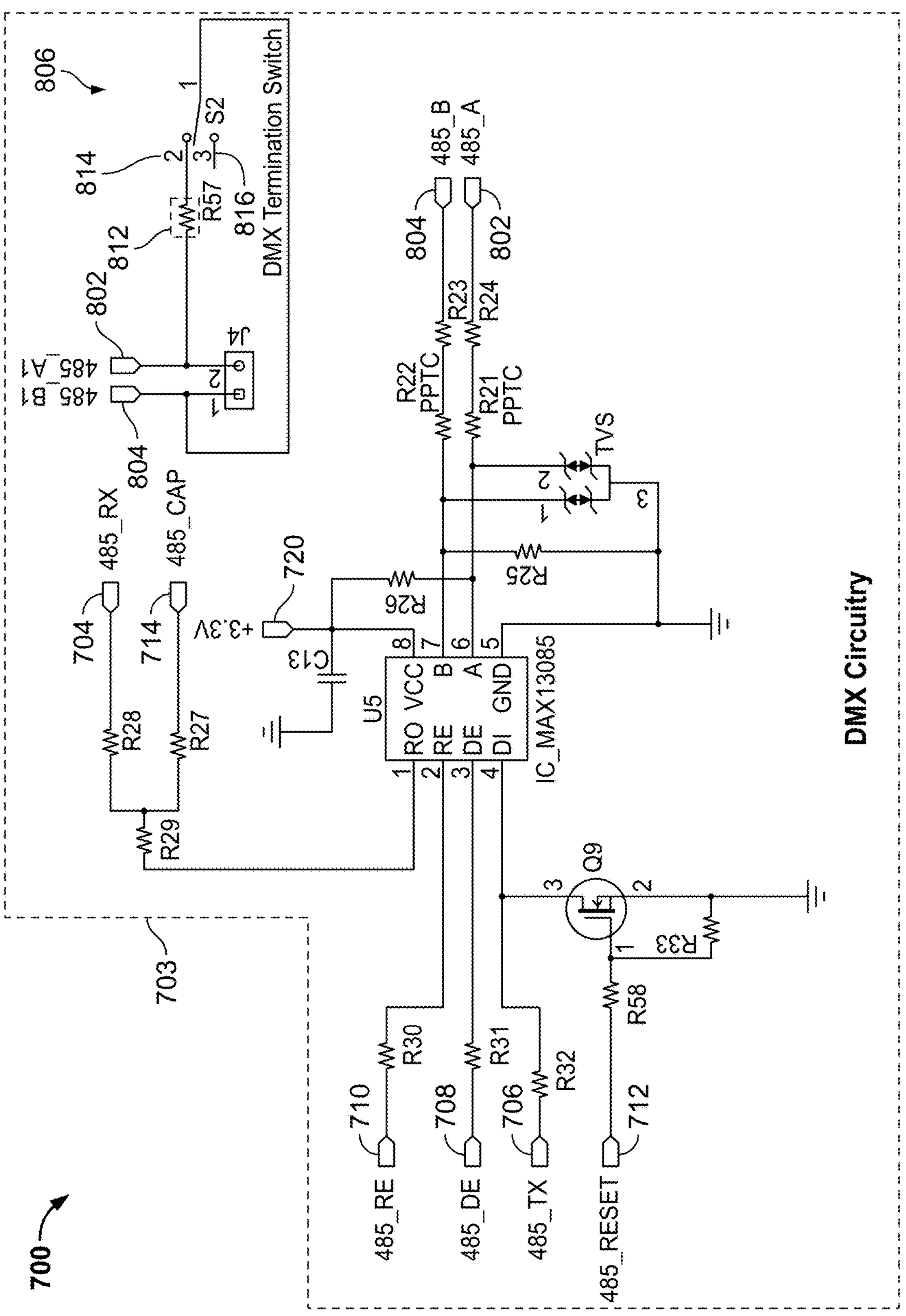
FIG. 8 shows schematically illustrative apparatus in accordance with the principles of the invention.

FIG. 8 shows further controller unit circuitry 700. Controller unit circuitry 700 may include DMX circuitry 703. DMX circuitry 703 may have one or more features in common with DMX circuitry 106. DMX circuitry 703 may receive DMX signals via ports 802 (485A) and 804 (485B). DMX circuitry 703 may receive DMX data from a DMX controller (not shown).

DMX circuitry 703 may include a DMX termination switch 806. DMX termination switch 806 may have one or more features in common with one or more of DMX termination switches 140, 220, 226, 230, 234, 238 and 312. DMX termination switch 806 may be used to attenuate DMX data being transmitted from a terminal controller unit. A terminal controller unit may include a controller unit that is coupled at the end of a daisy chain of controller units. DMX termination switch 806 may be set on pole 814 when the controller unit is coupled at the end of the daisy chain.

When DMX termination switch 806 is set on pole 814, resistor 812 may attenuate DMX data being transmitted from the controller unit. Resistor 812 may have any suitable value included in the ranges listed in Table 1.

DMX termination switch 806 may be used to enable DMX data transmission when the unit controller is a non-terminal controller unit. A non-terminal controller unit may not be coupled at the end of the daisy chain. DMX termination switch 806 may be set on pole 816 when the controller unit is a terminal controller unit. When DMX termination switch 806 is set on pole 816, DMX data may be transmitted from the controller unit to one or more of the connected controller units. A user may toggle DMX termination switch 806 between pole 814 and pole 816.

DMX circuitry 703 may receive input voltage 720. Input voltage 720 may power DMX circuitry 705.

Figure 9:
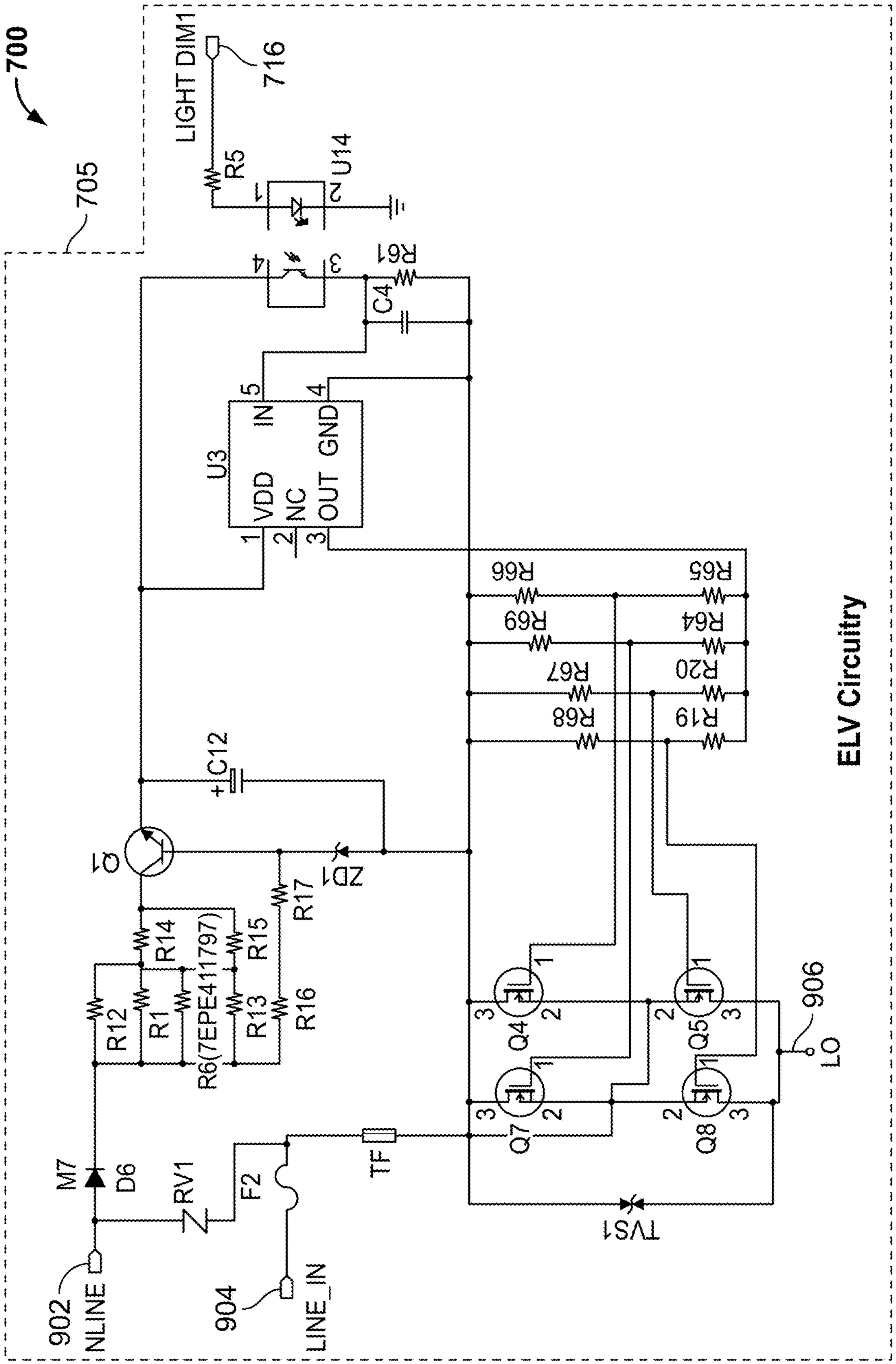
FIG. 9 shows schematically illustrative apparatus in accordance with the principles of the invention.

FIG. 9 shows further controller unit circuitry 700. Controller unit circuitry 700 may include ELV circuitry 705. ELV circuitry 705 may have one or more features in common with ELV circuitry 112. ELV circuitry 705 may receive the ELV dimming level via terminal 716 (LIGHT_DIM1). In response to receiving the ELV dimming level, ELV circuitry 705 may provide the light dimming level by reducing the flow of voltage at a trailing edge of wave included in line power received via terminal 902 (NLINE) and terminal 904 (LINE_IN). ELV circuitry 705 may include a plurality of MOSFETs to reduce the flow of voltage.

ELV circuitry 705 may provide power to one or more connected fixtures. ELV circuitry 705 may provide power via port 906. ELV circuitry 705 may provide power corresponding to the ELV dimming level received via terminal 716 (LIGHT_DIM1).

Figure 10:
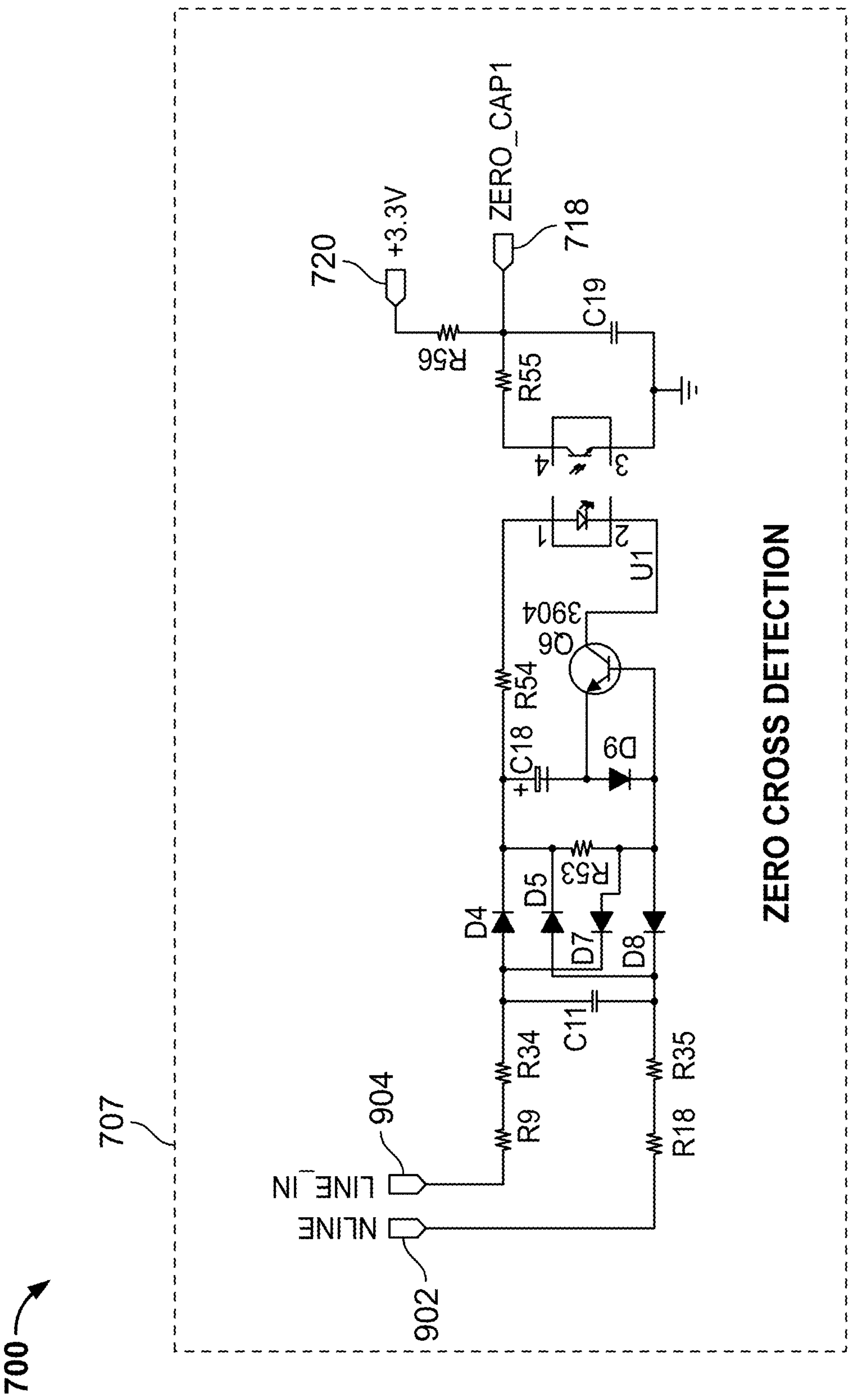
FIG. 10 shows schematically illustrative apparatus in accordance with the principles of the invention.

FIG. 10 shows further controller unit circuitry 700. Controller unit circuitry 700 may include zero cross detection circuitry 707. Zero cross detection circuitry 707 may have one or more features in common with zero detection circuitry 120. Zero cross detection circuitry 707 may be used to detect when the line voltage crosses zero. Zero cross detection circuitry 707 may transmit data corresponding to when the line voltage crosses zero to microcontroller 701 via terminal 718 (ZERO_CAP1). Zero cross detection circuitry 707 may be used to determine a phase of the line voltage. The phase may be used to determine when to reduce the flow of power in ELV circuitry 705.

Zero cross detection circuitry 707 may receive input voltage 720. Input voltage 720 may power zero cross detection circuitry 707.

Figure 11:
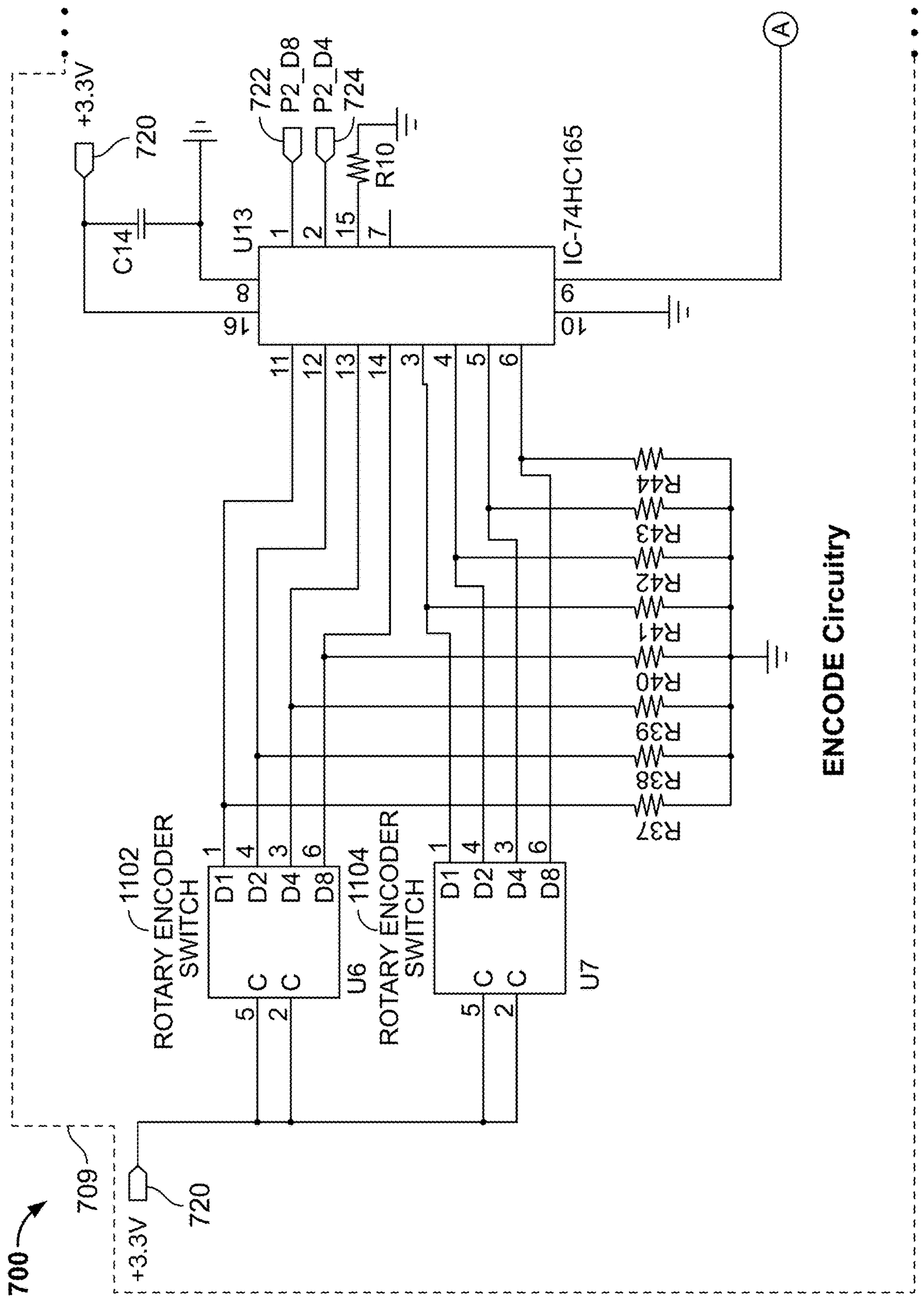
FIG. 11 shows schematically illustrative apparatus in accordance with the principles of the invention.
Figure 11:
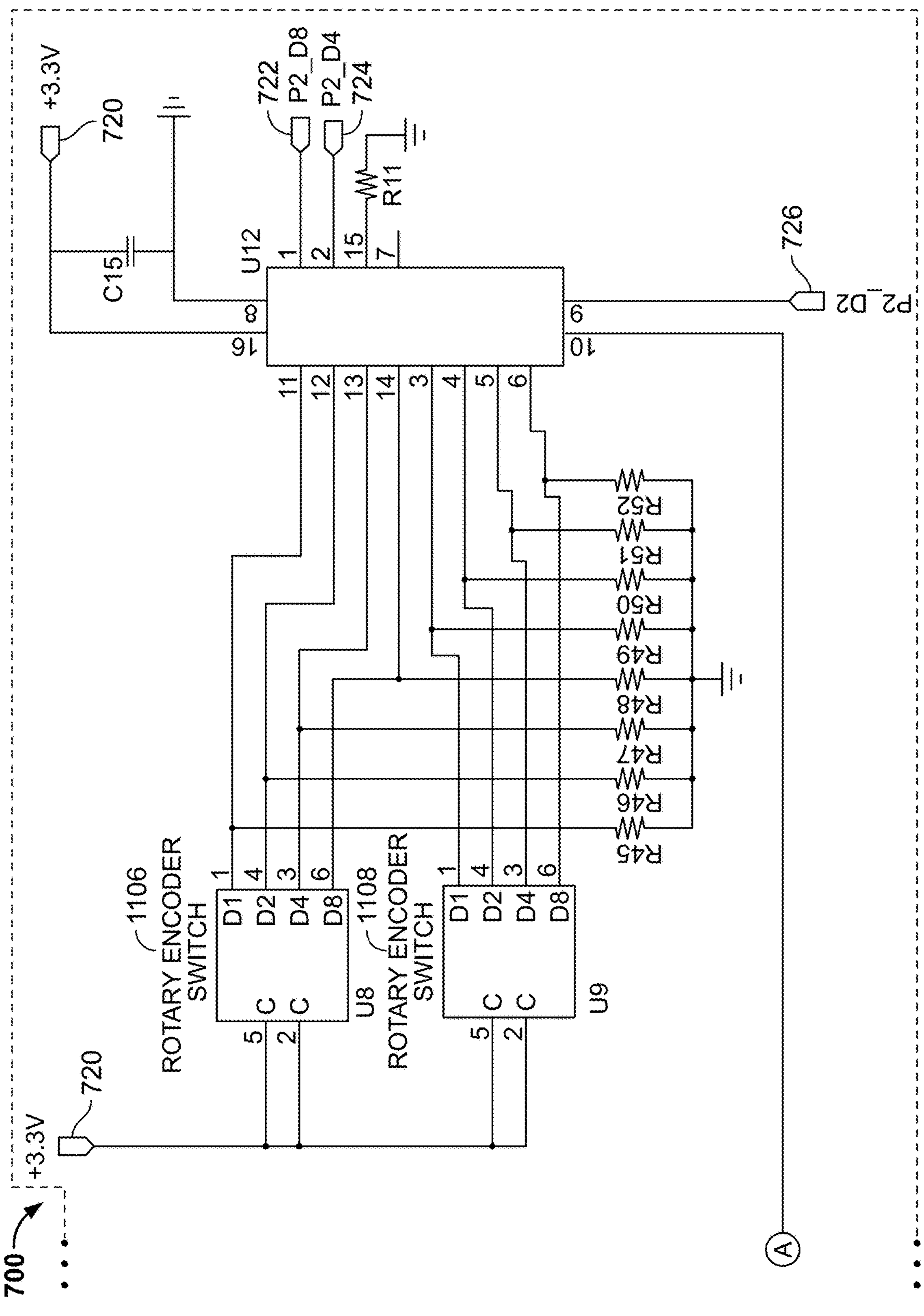

FIG. 11 shows further controller unit circuitry 700. Controller unit circuitry 700 may include encode circuitry 709. Encode circuitry 709 may have one or more features in common with encode circuitry 124. Encode circuitry 709 may include rotary dials 1102, 1104, 1106 and 1108. Encode circuitry 709 may be used to set a DMX address of the controller unit. Encode circuitry 709 may be used to select a dimming curve, with which to dim the light dimming level. Encode circuitry 709 may transmit the values corresponding to selected positions of rotary dials 1102, 1104, 1106 and 1108 to microcontroller 701 via terminals 726 (P2_D2), 724 (P2_D4) and 728 (P2-D8).

Encode circuitry 709 may receive input voltage 720. Input voltage 720 may power encode circuitry 709.

Figure 12:
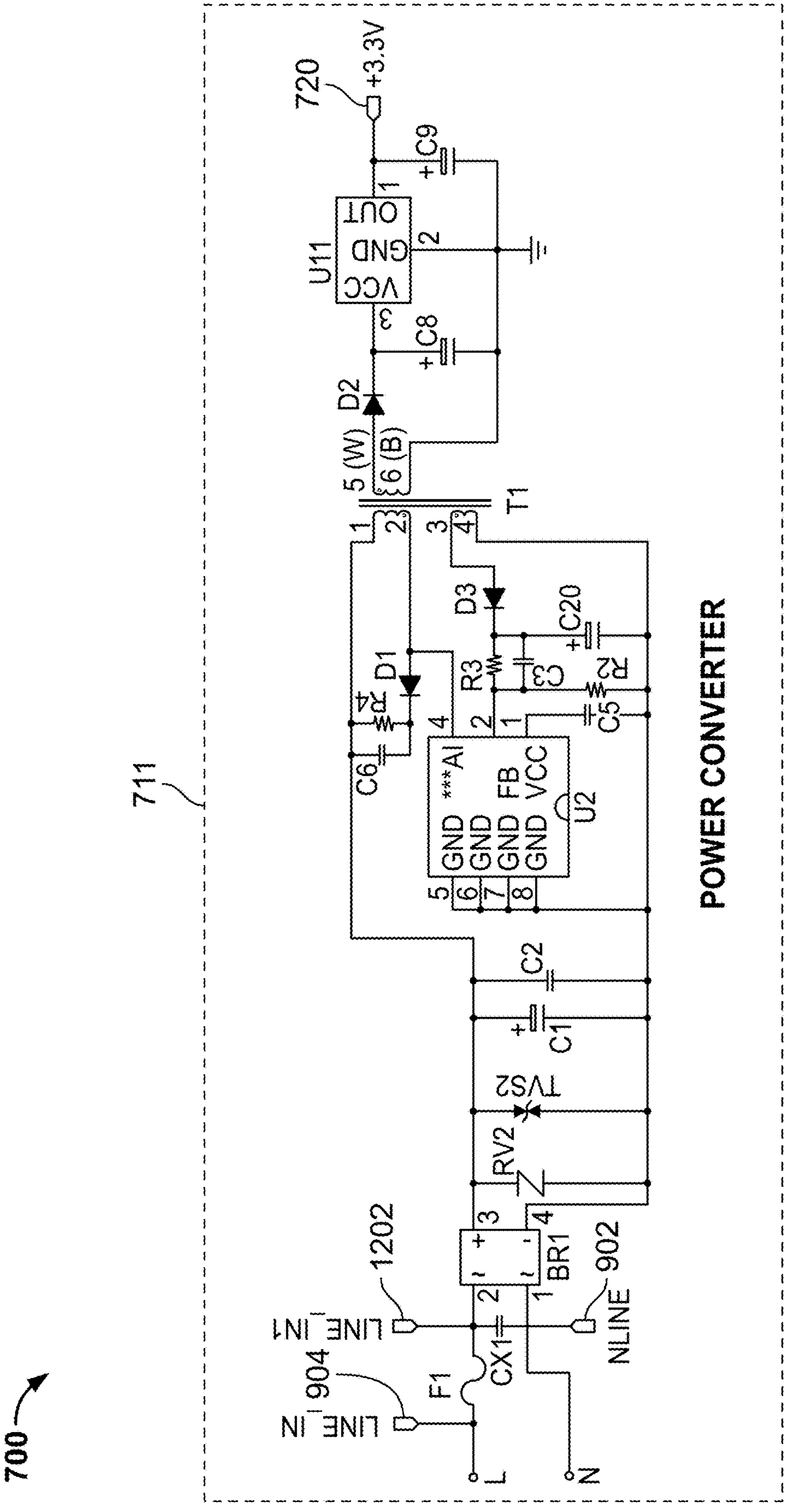
FIG. 12 shows schematically illustrative apparatus in accordance with the principles of the invention.

FIG. 12 shows further controller unit circuitry 700. Controller unit circuitry 700 may include power converter 711. Power converter 711 may have one of more features in common with power converter 122. Power converter 711 may receive line power via terminal 902 (NLINE) and terminal 904 (LINE_IN). Power converter 711 may receive line power via terminal 1202 (LINE_IN1). The line power may include 120 VAC. Power converter 711 may convert the line power into DC voltage. Power converter 711 may convert the line voltage into 3.3 VDC.

Table 3 lists illustrative circuit parts for controller unit circuitry 700.

TABLE 3

Illustrative circuit parts for controller unit circuitry 700:

| Component Tag | Item Description |
|---|---|
| D1, D6 | SMD RECTIFIER DIODE, 1 A/1000 V, SOD-123 |
| D2, D3, D4, D5, D7, D8, D9 | SUPER FAST RECOVER DIODE ES1JW 1 A/600 V |
| BR1 | SMD RECTIFIER BRIDEG 1 A/800 V, MBF10K, MBF |
| Q3, Q6 | SMD TRANSISTOR MMBT3904 NPN SOT-23 |
| C2, C6, C11 | X7R CHIP CAP 10 nF/1 KV, ±10%, 125° C.(1206) |
| C5 | X7R CHIP CAP 470 nF/50 V, ±10%, 125° C.(0805) |
| C3 | X7R CHIP CAP 1 uF/100 V ±10% 1206 |
| R2 | ¼ W CHIP RESISTOR, 2.2K ± 1%(1206) |
| R3 | ¼ W SMT RESISTOR, 10K ± 1%(1206) |
| R9, R16, R17, R18, R34, R35 | ¼ W_SMD RESISTOR_110K ± 1%_1206 |
| R4 | ¼ W CHIP RESISTOR, 150K ± 1%(1206) |
| R5, R57 | ¼ W CHIP RESISTOR, 220R ± 1%(1206) |
| R12, R13 | ¾ W CHIP RESISTOR, 100K ± 5%(2010) |
| R14, R15 | ¾ W SMT RESISTOR, 51K ± 5%(2010) |
| R19, R20, R64, R65 | ¼ W CHIP RESISTOR, 100R ± 1%(1206) |
| R53 | ⅛ W CHIP RESISTOR, 22K ± 1%(0805) |
| R54 | ⅛ W CHIP RESISTOR, 510R ± 1%(0805) |
| R55 | ⅛ W CHIP RESISTOR, 220R ± 1%(0805) |
| R56 | ⅛ W CHIP RESISTOR, 4.7K ± 1%(0805) |
| R66, R67, R68, R69 | ¼ W CHIP RESISTOR, 68K ± 5%(1206) |
| R61 | ⅛ W CHIP RESISTOR, 20K ± 1%(0805) |
| C4 | CHIP CAP 220 pF/500 V ± 5% (1206) |
| U1, U14 | SMD PHOTOCOUPLER, BL817S-C, 4-pin |
| U3 | SMD IC SA2530 SOT23-5 RoHS |
| U11 | SMD IC BL78L33 SOT-89 |
| ZD1 | SMT ZENER DIODE, 13 V, 0.5 W, SOD-123 |
| U2 | SMD IC BPA8505D SOP7 ROHS |
| | DOUBLE FR4 78.8*53.2*1.2 mm |
| C19 | X7R CHIP CAP 100 nF/50 V, ±10%, 125° C.(0805) |

TABLE 3-continued

Illustrative circuit parts for controller unit circuitry 700:

| Component Tag | Item Description |
|---|---|
| S2 | DIP SWITCH ZYD-1216G7 |
| T2 | ETHERNET CONNECTOR RJ45 |
| C8 | ELECTROLYTI CAP 100 uF/35 V, ±20%, Φ6.3*11 |
| C9, C12 | ELECTROLYTI CAP 10 uF/50 V, ±20%, Φ5*11 |
| C18 | ELECTROLYTI CAP 2.2 uF/50 V, Φ5*11 |
| C1 | ECAP 3.3 uF/500 V ±20% 105° C. Φ10*12.5 |
| F1 | 1 W WIRE WOUND FUSIBLE RESISTORS 4R7 ± 5% |
| RV1 | MOV Φ7 mm 560 V ± 10% 5 P TYPE HIGH SURGE |
| RV2 | MOV Φ10 mm 560 V ± 10% 7.5 P 125° C. HIGH SURGE |
| R1, R6 | 1 W DIP RESISTOR, 100K ± 5% T/R |
| C20 | ELECTROLYTI CAP 22 uF 50 V Φ5*11 7000 H |
| S1 | RED TOUCH SWITCH DC12V50mA 90 CORNER |
| L | BK 18 AWG CMP WIRE 250 MM |
| N | WT 18 AWG CMP WIRE 250 MM |
| LO | RD 18 AWG CMP WIRE 250 MM |
| F2 | 5A300V FUSE TIME LAG 8.5*8*4.1 |
| TF | DIP THERMAL FUSE |
| TVS1, TVS2 | DIP BI-DIRECT TVS 600 V DO-15 P6KE600CA |
| T1 | TRANSFORMER EE10 105:15:24 L = 0.9 mH |
| Q4, Q5, Q7, Q8 | DIP NMOS 20A650V FHF65R190AF TO-220F |
| CX1 | X2 CAP 0.22 uF/310 V ± 10% P = 10 L = 5.0 |
| | A2C01 POWER BOARD SMD PART |
| C10, C13, C14, C15, C16 | X7R CHIP CAP 100 nF/50 V, ±10%, 125° C.(0805) |
| C17 | X7R CAP 10 UF/16 V ± 20% 125° C. (0805) |
| Q9 | SMD NMOS LBSS138LT1G 0.2 A/50 V SOT-23 |
| R6, R29, R30, R31, R32 | ¼ W CHIP RESISTOR, 1K ± 5%(1206) |
| R7 | ⅛ W CHIP RESISTOR, 4.7K ± 1%(0805) |
| R8 | ⅛ W CHIP RESISTOR, 1.5K ± 1%(0805) |
| R10, R11, R33, R37-R52 | 1/10 W_SMD RESISTOR_10K ± 1%(0603) |
| R21, R22 | SMD RECOVER FUSE 0.05 A/60 V(1206) |
| R23, R24 | CHIP RESISTOR, ⅛ W 51R ± 1%(0805) |
| R25, R26 | ⅛ W CHIP RESISTOR, 47K ± 1%(0805) |
| R58 | 1/10 W CHIP RESISTOR, 22R ± 5%(0603) |
| TVS | SMD DUL-TVS 7 V/12 V(SOT-23) SM712 |
| U5 | SMD IC MAX3485ESA SO-8 |
| U10 | SMD IC ME32S003 AF6P7 TAPE&REEL RoHS |
| U12, U13 | CHIP IC, 74HC165, SOIC-16 |
| | DOUBLE FR4 65*52*1.2 mm RoHS |
| | A2C01 CONTROL BOARD SMD PART |
| U6, U7, U8, U9 | 10 POSITION ROTARY ENCODER SWITCH |
| | Any other suitable circuit components |

Functions of electrical circuits, or parts thereof, disclosed herein may be incorporated into or combined with other electrical circuits, or parts thereof, disclosed herein, or with other suitable electrical circuits.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus, methods for light dimming have been provided. Persons skilled in the art will appreciate that the present invention may be practiced by other than the described embodiments, which are presented for purposes of illustration rather than of limitation.

What is claimed is:

1. A controller unit for dimming light, the controller unit comprising: comprising:

digital lighting control circuitry configured to receive a digital lighting control signal including a light dimming level;

analog phase cut circuitry configured to:

receive the light dimming level; and provide an analog lighting power corresponding to the received light dimming level, to a lighting power output port; and a digital lighting control output circuit that is configured to:

in a first state, transmit the digital lighting control signal to another controller unit; and, in a second state, attenuate the digital lighting control signal;

wherein the controller unit: includes a microcontroller configured to:

obtain the light dimming level from the digital lighting control signal; and transmit the light dimming level to the analog phase cut circuitry; and is configured to be included in a controller unit daisy chain that includes the other controller unit.

2. The controller unit of claim 1 wherein the digital lighting control signal includes digital multiplex ("DMX") signal.

3. The controller unit of claim 1 wherein the analog phase cut circuitry includes electric low voltage ("ELV") circuitry.

4. The controller unit of claim 1 wherein the analog phase cut circuitry includes triode for alternating current ("TRIAC") circuitry.

5. The controller unit of claim 1 wherein the second state terminates the digital lighting control signal when the controller unit is a terminal controller unit in the daisy chain.

6. The controller unit of claim 1 wherein the first state transmits the digital lighting control signal when the controller unit is a non-terminal controller unit in the daisy chain.

7. The controller unit of claim 1 wherein the digital lighting control output circuit includes a switch.

8. The controller unit of claim 7 wherein the switch is a manual switch.

9. The controller unit of claim 8 wherein the switch includes:
a first contact including a resistor; and
a second contact.

10. The controller unit of claim 9 wherein:
when the switch is set on the first contact, the first state is enabled; and
when the switch is set on the second contact, the second state is enabled.

11. The controller unit of claim 7 wherein the switch in an electronic switch.

12. The controller unit of claim 7 wherein the first state and the second state are selectable by a user.

13. The controller unit of claim 7 wherein the microcontroller is further configured to select between the first state and the second state.

14. A controller unit for dimming light comprising:
digital lighting control circuitry configured to receive a digital lighting control signal including a light dimming level;
analog phase cut circuitry configured to:
receive the light dimming level; and
provide an analog lighting power corresponding to the received light dimming level, to a lighting power output port; and
a mode circuit that is configured to transmit to the analog phase cut circuitry a stored brightness level;
wherein: the controller unit further includes a microcontroller configured to:
obtain the light dimming level from the digital lighting control signal; and
transmit the light dimming level to the analog phase cut circuitry; and
the stored brightness level overrides any dimming levels previously received in the digital lighting control signal.

15. The controller unit of claim 14 wherein the digital lighting control signal includes digital multiplex ("DMX") signal.

16. The controller unit of claim 14 wherein the analog phase cut circuitry includes electric low voltage ("ELV") circuitry.

17. The controller unit of claim 14 wherein the analog phase cut circuitry includes triode for alternating current ("TRIAC") circuitry.

18. The controller unit of claim 14 wherein the mode circuit includes a mode switch comprising:
a first position corresponding to a first mode; and
a second position corresponding to a second mode.

19. The controller unit of claim 18 wherein:
the first mode corresponds to first lighting setting to transmit to the analog phase cut circuitry; and
the second mode corresponds to a second lighting setting to transmit to the analog phase cut circuitry.

20. The controller unit of claim 19 wherein when the stored brightness level is a first stored brightness level, the first lighting setting includes the first stored brightness level and the second lighting setting includes a second stored brightness level.

21. The controller unit of claim 20 wherein the mode switch includes a pushbutton.

22. The controller unit of claim 21 wherein the mode circuit is further configured to be toggled between the first mode and the second mode in response to the pushbutton being pressed.

23. The controller unit of claim 22 wherein the pushbutton is configured to be pressed by a user.

24. The controller unit of claim 20 wherein the first stored brightness level and the second stored brightness level are configured to be selected by a user.

25. The controller unit of claim 20 wherein the first stored brightness level and the second stored brightness level are configured to be preset brightness levels.

26. The controller unit of claim 20 wherein the mode switch is included in the microcontroller.

27. The controller unit of claim 26 wherein the mode circuit is further configured to automatically transmit the first stored brightness level in response to a failure to detect the digital lighting control signal at the microcontroller.

28. The controller unit of claim 27 wherein the mode circuit is further configured to toggle between the first mode and the second mode in response to receiving a switching instruction from the microcontroller.

* * * * *